US008170529B1

(12) United States Patent
Breau et al.

(10) Patent No.: US 8,170,529 B1
(45) Date of Patent: May 1, 2012

(54) SUPPORTING MULTIPLE AUTHENTICATION TECHNOLOGIES OF DEVICES CONNECTING TO A WIRELESS NETWORK

(75) Inventors: Jeremy R. Breau, Kansas City, MO (US); Arun Santharam, Olathe, KS (US); Serge Manning, Overland Park, KS (US); Reza Jafari, Olathe, KS (US); Shingara Dhanoa, Overland Park, KS (US)

(73) Assignee: Clearwire IP Holdings LLC, Bellevue, WA (US)

( * ) Notice: Subject to any disclaimer, the term of this patent is extended or adjusted under 35 U.S.C. 154(b) by 846 days.

(21) Appl. No.: 11/672,787

(22) Filed: Feb. 8, 2007

(51) Int. Cl.
*H04W 1/66* (2006.01)

(52) U.S. Cl. .................. 455/411; 455/432.1; 455/435.1; 380/247

(58) Field of Classification Search .................. 713/155, 713/161, 168–171, 176; 370/328, 331–332, 370/338; 340/5.8–5.86, 825.34; 379/142.05; 726/2–12, 16, 26–35; 455/411, 432.1, 435.1; 380/247
See application file for complete search history.

(56) References Cited

U.S. PATENT DOCUMENTS

| | | | |
|---|---|---|---|
| 7,133,386 B2 * | 11/2006 | Holur et al. | 370/331 |
| 7,411,927 B1 * | 8/2008 | Bhalla et al. | 370/331 |
| 7,613,811 B1 * | 11/2009 | Bhalla et al. | 709/227 |
| 2003/0208602 A1 * | 11/2003 | Bhalla et al. | 709/227 |
| 2006/0062238 A1 * | 3/2006 | Mahendran et al. | 370/437 |
| 2007/0201469 A1 * | 8/2007 | Iyer et al. | 370/391 |
| 2007/0208855 A1 * | 9/2007 | Yegani et al. | 709/225 |
| 2007/0254661 A1 * | 11/2007 | Chowdhury et al. | 455/436 |
| 2007/0297377 A1 * | 12/2007 | McCann et al. | 370/338 |
| 2008/0059792 A1 * | 3/2008 | Feder et al. | 713/155 |
| 2008/0082642 A1 * | 4/2008 | Wu | 709/222 |
| 2008/0108322 A1 * | 5/2008 | Upp | 455/411 |
| 2009/0193253 A1 * | 7/2009 | Falk et al. | 713/171 |
| 2010/0011426 A1 * | 1/2010 | Falk et al. | 726/7 |

OTHER PUBLICATIONS

WiMAX Forum. "WiMAX End-to-End Network Systems Architecture (Stage 2: Architecture Tenets, Reference Model and Reference Points)" Sep. 15, 2005.*
3$^{rd}$ Generation Partnership Project 2 "3GPP2". 3GPP2 P.S0001-B Version 1.0.0. "Wireless IP Network Standard", Oct. 25, 2002.*
3rd Generation Partnership Project 2 "3GPP2". 3GPP2 X.S0011-002-D Version 1.0 "cdma2000 Wireless IP Network Standard: Simple IP and Mobile IP Access Services", Feb. 2006.*

\* cited by examiner

*Primary Examiner* — Kent Chang
*Assistant Examiner* — Marcus Hammonds
(74) *Attorney, Agent, or Firm* — Shook, Hardy & Bacon L.L.P.

(57) ABSTRACT

A method, system, and computer-readable media are provided for determining connection needs of a mobile device connecting to a wireless network. In one aspect, the computer-readable media provide a method that includes receiving a request from a mobile device to access a wireless network, and performing an authentication phase related to the mobile device attempting to access the wireless network. Furthermore, the method includes evaluating signaling behavior of the mobile device during the authentication phase to determine which access technology from a plurality of types of access technologies to use to connect the mobile device to the wireless network. Moreover, the method includes connecting the mobile device to the wireless network using the determined access technology.

14 Claims, 5 Drawing Sheets

SUPPORTING MULTIPLE AUTHENTICATION TECHNOLOGIES OF DEVICES CONNECTING TO A WIRELESS NETWORK

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Today, mobile devices wishing to connect to a wireless network must have a specific set of parameters configured in the device in order to obtain service from that wireless network. This is due in part because most wireless networks are configured to only support one type of access technology—either client Mobile Internet Protocol (client MIP), simple Internet Protocol (simple IP), or proxy MIP.

It is expected that the IEEE 802.16 Worldwide Interoperability for Microwave Access (WiMAX) standard will create a large number of IP enabled network devices. Some of these devices may not be configured to conform to any single authentication method. In order to facilitate connectivity to a large number of devices that may not conform to any single or specific authentication method, a method is needed for intelligently allowing devices access to a wireless network and controlling that access in order to maximize the service capabilities of the wireless network.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is defined by the claims below. Embodiments of the present invention solve at least the above problems by providing a system and method for, among other things, determining connection needs of a mobile device connecting to a wireless network.

In a first aspect, a set of computer-readable media provide a method that includes receiving a request from a mobile device to access a wireless network, and performing an authentication phase related to the mobile device attempting to access the wireless network. Furthermore, the method includes evaluating signaling behavior of the mobile device during the authentication phase to determine which access technology from a plurality of types of access technologies to use to connect the mobile device to the wireless network. Moreover, the method includes connecting the mobile device to the wireless network using the determined access technology.

In a second aspect, a set of computer-readable media provide another method that includes using a client mobile internet protocol technology to connect a mobile device to a wireless network when a user of the mobile device is not authenticated. Additionally, the method includes using a simple internet protocol technology to connect the mobile device to the wireless network when the user and the mobile device are authenticated. Furthermore, the method includes using a proxy mobile internet protocol technology to connect the mobile device to the wireless network when the user is authenticated, the mobile device is authenticated, and proxy mobile key are negotiated between the mobile device and a network component.

In a third aspect, a system is provided that includes an authentication component for performing an authentication phase related to a mobile device connecting to a wireless network. The system further includes an access technology component for determining an access technology to use to connect the mobile device to the wireless network. Additionally, the system includes a client mobile internet protocol component for connecting the mobile device to the wireless network using a client mobile internet protocol technology. Moreover, the system includes a simple internet protocol component for connecting the mobile device to the wireless network using a simple internet protocol technology. The system further includes a proxy mobile internet protocol component for connecting the mobile device to the wireless network using a proxy mobile internet protocol technology.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Various technical terms are used throughout this description. A definition of such terms can be found in Newton's Telecom Dictionary by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Figure 1:
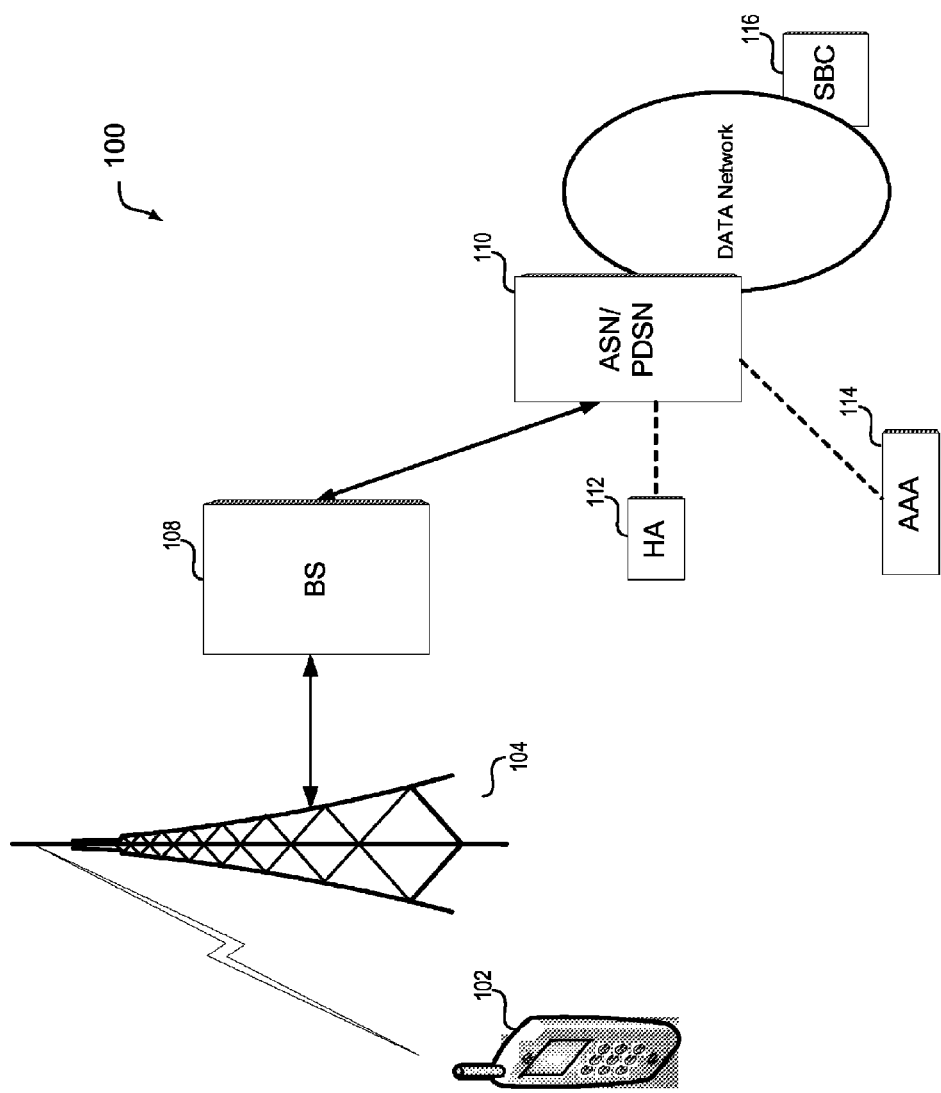
FIG. 1 is block diagram of an embodiment of a communication network that can be employed by the invention.

FIG. 1 is block diagram of an embodiment of a communication network 100 that can be employed by the invention. Mobile device 102 may be or can include a laptop computer, a network-enabled mobile telephone (with or without media capturing/playback capabilities), a wireless email client, a personal digital assistant (PDA), or other software client. The mobile device 102 may also include a machine or device to perform various tasks including video conferencing, web browsing, search, electronic mail (email) and other tasks, applications and functions. Mobile device 102 may additionally be a portable media device such as digital camera devices, digital video cameras (with or without still image capture functionality), media players such as personal music players and personal video players, and other portable media devices. The mobile device 102 can include a communication interface that can allow the mobile device 102 to transmit information via radio signals to a communication tower 104.

The Base Station (BS) 108 contains equipment for transmitting and receiving radio signals (transceivers) from a communication tower 104. BS 108 also has other equipment for encrypting and decrypting communication with the mobile device 102. The BSC 108 may be configured to receive a radio signal that is converted into Time Division Multiplexing (TDM). The BS 108 may handle the allocation of radio channels and may receive measurements from mobile devices. The BS 108 may also be configured to send voice information from the TDM signal to a Mobile Switching Center (MSC) and data information to an Access Service Network (ASN) or a Packet Data Serving Node (PDSN) 110.

The ASN/PDSN 110 may be a component of a mobile network. The ASN/PDSN 110 may act as a connection point between the Radio Access and Internet Protocol (IP) networks. The ASN/PDSN 110 component may be responsible for managing Point-to-Point Protocol (PPP) sessions between the mobile device's core IP network and the mobile device. The Home Agent (HA) 112 may be a router located in a home network of the mobile device 102. The HA 112 allows a mobile device to connect to the Internet or data network by assigning an IP address and binding it to a Care-of-Address (COA). The HA 112 can forward packets to an appropriate network when a mobile device is away from its home area or home network. An authentication, authorization, and accounting (AAA) server 114 is a server program that handles user requests for access to a network and provides AAA services. The AAA server 114 may interact with network access servers, gateway servers, databases, and directories containing user information. A Session Border Controller (SBC) 116 may be a device used in some Voice over Internet Protocol (VoIP) networks to exert control over the signaling and media streams involved in setting up, conducting, and tearing down calls. The SBC 116 may be put into the signaling and/or media path between the party making a call and the party receiving the call. In an embodiment, the SBC 116 may act as a VoIP phone when it receives a call from a calling party, and can place a second call to the called party. The effect of this behavior may be that the signaling traffic and media traffic (voice, video, etc.) crosses the SBC. This behavior may also be prevalent during conference communications.

Figure 2:
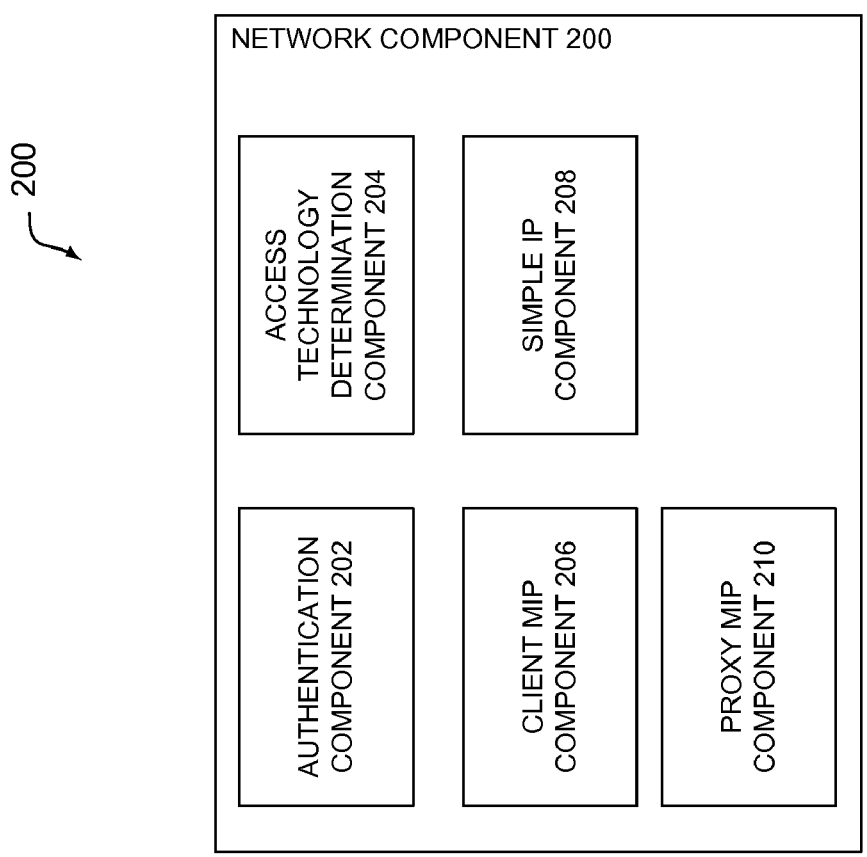
FIG. 2 is a block diagram of an embodiment of a network component including the logic of the invention.

FIG. 2 is a block diagram of an embodiment of a network component including the logic of the invention. In an embodiment, the network component 200 is an ASN gateway component. The network component 200 accepts inbound connections for mobile devices, supports authentication of those devices, supports the assignment of IP addresses for those mobile devices, and terminates connectivity for those devices. The network component 200 contains the logic of the invention for determining which access technology a mobile device utilizes and for supporting the given access technology. In other embodiments, the logic of the invention may be located or processed in more than one network component.

In an embodiment, the network component 200 includes authentication component 202, access technology determination component 204, client Mobile Internet Protocol (MIP) component 206, simple Internet Protocol (IP) component 208, and proxy MIP component 210. The authentication component 202 is used to perform device authentication of a mobile device attempting to connect to a wireless network, and performs user authentication of the user utilizing such mobile device. The authentication component 202 is configured to employ an authentication protocol for performing device and user authentication. In an embodiment, the authentication component 202 uses the Extensible Authentication Protocol (EAP). The access technology determination component 204 listens to cues based on signaling from the device during the device and user authentication phases to determine what type of access technology, either client MIP, simple IP, or proxy MIP, it will use for the mobile device when establishing an IP session. Client MIP component 206 will be used by the network component to establish IP connectivity if it is determined that the mobile device is configured to use client MIP, simple IP component 208 will be used by the network component to establish IP connectivity if it is determined that the mobile device is configured to use simple IP, and proxy MIP component 210 will be used by the network component to establish IP connectivity if it is determined that the mobile device is configured to use proxy MIP. Each component 206, 208, and 210 will contain the necessary logic to establish IP connectivity for their respective access technology.

Figure 3:
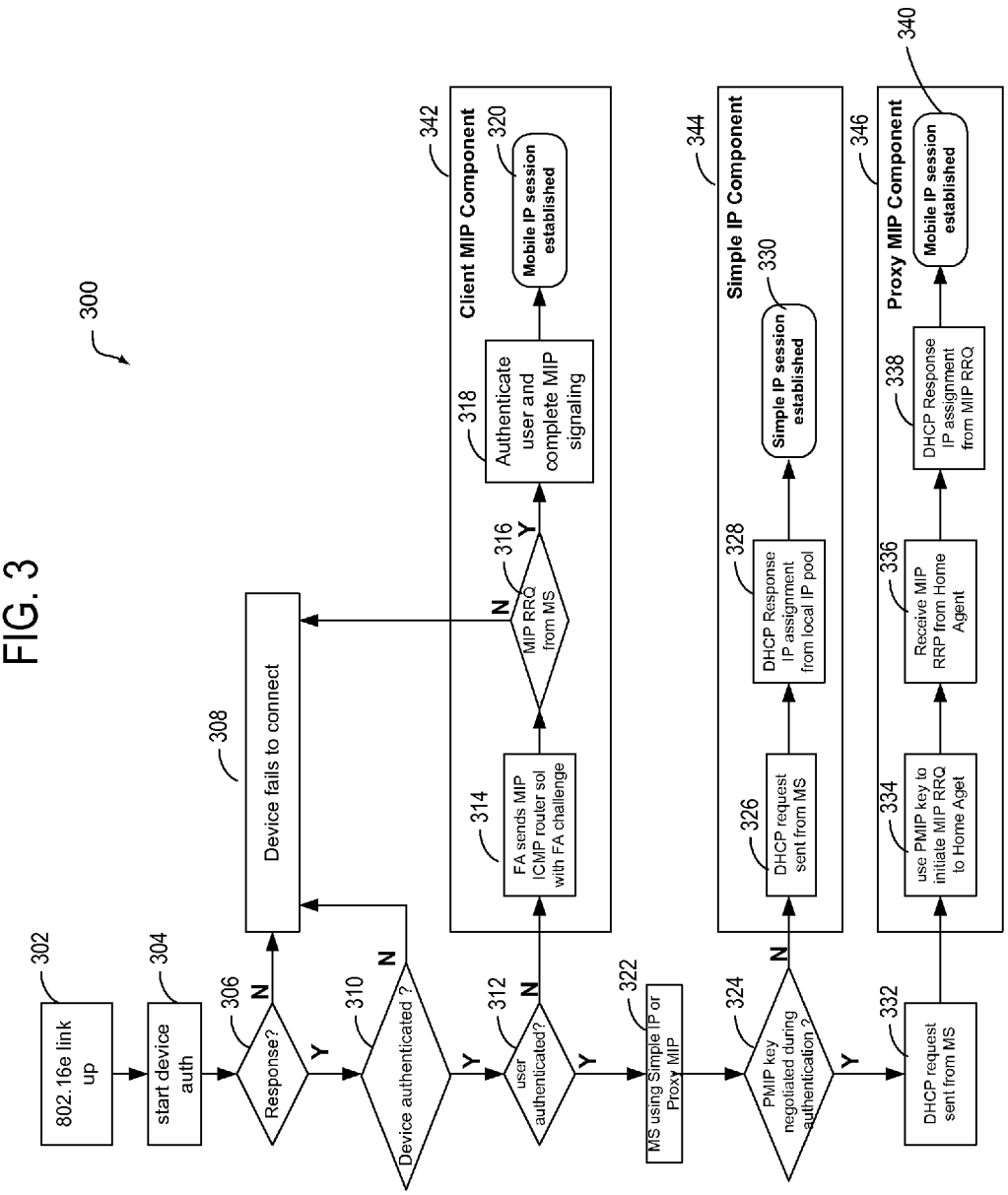
FIG. 3 is a flow diagram of an exemplary method for detecting and supporting a plurality of types of access technologies within a WiMAX environment.

FIG. 3 is a flow diagram of an exemplary method 300 for detecting and supporting a plurality of types of access technologies within a WiMAX environment. At operation 302, a mobile device initiates a link to a 802.16e WiMAX network. At operation 304, device authentication begins. In an embodiment, the device authentication process is performed by a network component such as an ASN. In other embodiments, the device authentication process may be performed by network components other than an ASN. In an embodiment, the mobile device is authenticated via EAP. In other embodiments, a different authentication protocol may be used.

In the device authentication operation, the network component sends a request to the mobile device to begin authentication. If the network component determines the mobile device did not respond to the request at operation 306, the mobile device's attempted connection is denied at operation 308. The mobile device may not respond to the request if, for example, the mobile device is not capable of performing a particular authentication protocol, the mobile device does not have an account with the network service provider, or the type of authentication protocol supported by the mobile device is different that the type proposed by the network. At operation 310, the network component attempts to authenticate the mobile device and determines if the mobile device is able to properly authenticate itself onto the network. If the mobile device is not authenticated, the mobile device's connection is denied at operation 308. If, however, the mobile device is able to properly authenticate itself, the authentication process continues.

At operation 312, a determination is made as to whether the user was properly authenticated. If the user is not authenticated through the authentication protocol, the network component will assume that the mobile device is using client MIP and the authentication process continues to the client MIP component 342. In an embodiment, the user is not authenticated if the mobile device does not accept or perform user authentication of the given authentication protocol. In another embodiment, the user is not authenticated if the mobile device does accept or perform user authentication of the given protocol and does not have valid authentication parameters to properly authenticate the user.

Once it is determined that the user could not be authenticated, the authentication process continues in the client MIP component 342. At operation 314, a foreign agent (FA) sends a Internet Control Messaging Protocol (ICMP) router solicitation message and a FA challenge to the mobile device to begin the set-up of a MIP session. In an embodiment, the FA is a part of the network component. The FA challenge informs the mobile device to begin user authentication. At operation 316, a determination is made as to whether a MIP registration request is received from the mobile device in response to the mobile device receiving the ICMP router solicitation message and FA challenge. The MIP registration request contains the user authentication parameters for client MIP as well as other parameters used to initiate the client MIP session. Some of the parameters sent in the MIP registration request include the user's client MIP user name and password. If the mobile device does not send the MIP registration request, the network component will deny the mobile device's request to connect to the network at operation 308. The network component will deny the request through the assumption that the mobile device does not support the initial authentication protocol used in operation 312 and also does not support client MIP. However, if the MIP registration request is received from the mobile device, the user is authenticated using the parameters within the MIP registration request, and MIP signaling is completed at operation 318. If the user is successfully authenticated, the MIP session is established at operation 320 by assigning the mobile device an IP address from which it can use to initiate IP communication to an IP network.

If the user is initially authenticated at operation 312, the network component assumes the mobile device is configured to use either simple IP or proxy MIP at operation 322. At operation 324, a determination is made as to whether proxy MIP keys were negotiated between the mobile device and the network component during either the device authentication or user authentication phases of operations 310 and 312 respectively. If proxy MIP keys were negotiated during one of the two operations, the network component would then be able to support proxy MIP for that device and could use the keys as authentication parameters needed to establish a MIP session. With the keys, the network component can act on behalf of the mobile device to initiate the MIP signaling to establish a MIP session.

If it is determined that no proxy MIP keys were negotiated, the network component will assume the mobile device supports simple IP and processing will continue with the simple IP component 344. At operation 326, the network component waits to receive a Dynamic Host Configuration Protocol (DHCP) request from the mobile device for an IP address in order to establish connectivity. At operation 328, a DHCP response including an assigned IP address is sent to the mobile device, and the simple IP session is established at operation 330.

If it is determined that proxy MIP keys were negotiated, the network component will assume that the device supports proxy MIP and processing will continue with the proxy MIP component 346. At operation 332, the network component waits to receive a DHCP request from the mobile device. At operation 334, the network component uses the proxy MIP key to initiate a MIP registration request to the mobile device's Home Agent (HA) on behalf of the mobile device. The MIP registration request may include authentication parameters as well as other parameters needed to register the mobile device on the MIP network. At operation 336, a reply to the MIP registration request is received from the HA. The reply includes an assigned IP address for the mobile device to use to establish IP connectivity. At operation 338, the assigned IP address is included within a DHCP response, and the DHCP response is sent to the mobile device. With the IP address, the mobile device can establish a proxy MIP session at operation 340.

Figure 4:
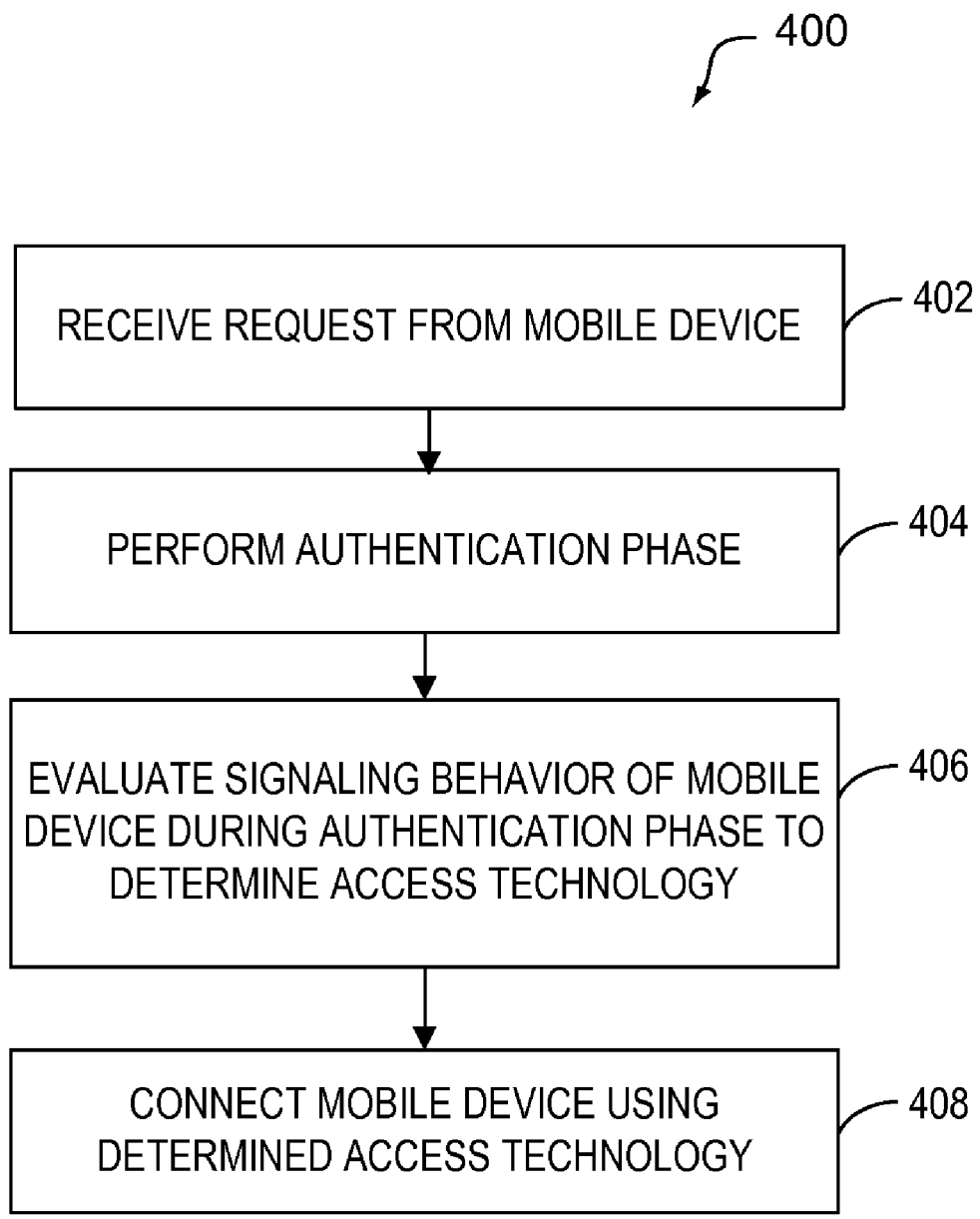
FIG. 4 is a flow diagram of an exemplary process for determining connection needs of a mobile device connecting to a wireless network.

FIG. 4 is a flow diagram of an exemplary method 400 for determining connection needs of a mobile device connecting to a wireless network. At operation 402, a request is received from a mobile device to access the wireless network. In an embodiment, the request is received by a network component such as an ASN. At operation 404, an authentication phase is performed. The authentication phase includes a device authentication stage of the mobile device and a user authentication stage of the user using the mobile device. At operation 406, the signaling behavior of the mobile device is evaluated during the authentication phase to determine which access technology to use to connect the mobile device to the wireless network. The signaling behavior can include signals relating to whether the mobile device responded to the device authentication stage, whether the mobile device was authenticated, whether the device accepted or performed user authentication, whether the device provided a MIP registration request, whether proxy MIP keys were negotiated between the mobile device and the network component, and other information related to the authentication phase. At operation 408, the mobile device is connected to the wireless network using the determined access technology.

Figure 5:
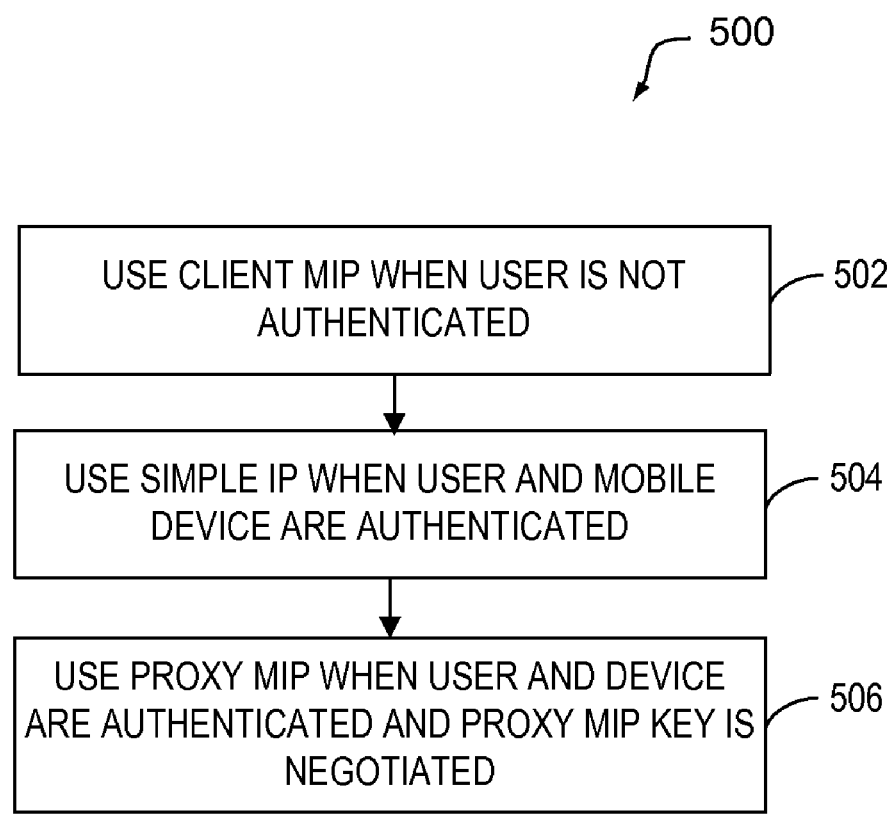
FIG. 5 is a flow diagram of another exemplary process for determining connection needs of a mobile device connecting to a wireless network.

FIG. 5 is a flow diagram of another exemplary method 500 for determining connection needs of a mobile device connecting to a wireless network. At operation 502, a client MIP technology is used to connect a mobile device to the wireless network when a user of the mobile device is not authenticated. The network component, for example, may be used to determine when a user of the mobile device is not authenticated. At operation 504, a simple IP technology is used to connect the mobile device to the wireless network when the user and the mobile device are authenticated. The network component, for example, may be used to determine when the user and the mobile device are authenticated. At operation 506, a proxy MIP technology is used to connect the mobile device to the wireless network when the user is authenticated, the mobile device is authenticated, and proxy mobile keys are negotiated between the mobile device and the network component. The network component, for example, may be used to determine when the user is authenticated, the mobile device is authenticated, and proxy mobile keys are negotiated.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more tangible computer-readable media having computer-useable instructions embodied thereon for performing a method for determining connection needs of a mobile device connecting to a wireless network, the method comprising:
    receiving a request at an access service network gateway from the mobile device to access the wireless network;
    performing an authentication phase at the access service network gateway related to the mobile device attempting to access the wireless network;
    determining, by the access service network gateway, which access technology from a plurality of types of access technologies to use to connect the mobile device to the wireless network, wherein determining the access technology includes
        (A) determining whether the mobile device is authenticated,
        (B) upon determining that the mobile device is authenticated, then determining whether the user is authenticated,
        (C) when the user is not authenticated, then determining to use client mobile Internet protocol (MIP),
        (D) when the user is authenticated, then determining whether a proxy MIP key was negotiated,
        (E) when the proxy MIP key was negotiated, then determining to use proxy MIP; and
        (F) when no proxy MIP keys were negotiated, then determining to use simple Internet protocol; and
    connecting the mobile device to the wireless network using the access technology that is determined, wherein the access service network gateway assigns client MIP, simple internet protocol, or proxy MIP as the access technology.

2. The media according to claim 1, wherein the authentication phase includes a device authentication stage and a user authentication stage.

3. The media according to claim 2, wherein the plurality of types of access technologies include the client mobile internet protocol, the simple internet protocol, and the proxy mobile internet protocol.

4. The media according to claim 3, wherein the client mobile internet protocol is used to connect the mobile device to the wireless network when the user is not authenticated during the user authentication stage and a mobile internet protocol registration request is received from the mobile device.

5. The media according to claim 1, wherein the wireless network is a Worldwide Interoperability for Microwave Access network.

6. One or more tangible computer-readable media having computer-useable instructions embodied thereon for performing a method for determining connection needs of a mobile device connecting to a wireless network, the method comprising:
    using a client mobile internet protocol technology to connect the mobile device to the wireless network when a user of the mobile device is not authenticated;
    using a simple internet protocol technology to connect the mobile device to the wireless network when the user and the mobile device are authenticated; and
    using a proxy mobile internet protocol to connect the mobile device to the wireless network when
        (A) the user is authenticated,
        (B) the mobile device is authenticated, and
        (C) at least one proxy mobile internet protocol key is negotiated between the mobile device and an Access Service Network gateway,
    wherein the Access Service Network gateway authenticates the mobile device and the user, listens to cues based on a signaling from the mobile device and determines an access technology to use when establishing an internet protocol session, and establishes internet protocol connectivity using client mobile internet protocol, simple internet protocol, or proxy mobile internet protocol, wherein the Access Service Network gateway determines which access technology to use to connect the mobile device to the wireless network, and wherein the Access Service Network gateway acts on behalf of the mobile device to initiate mobile internet protocol signaling to establish a mobile internet protocol session using the wireless network, wherein the access technologies include client mobile internet protocol technology, the simple internet protocol technology, and the proxy mobile internet protocol technology.

7. The media according to claim 6, wherein the wireless network is a Worldwide Interoperability for Microwave Access network.

8. The media according to claim 6, wherein a connection is denied during a use of the client mobile internet protocol technology and the mobile device does not provide a mobile internet protocol registration request.

9. The media according to claim 6, wherein the user and the mobile device are authenticated using an Extensible Authentication Protocol.

10. A system for determining connection needs of a mobile device connecting to a wireless network, comprising:
    an authentication component for performing an authentication phase related to the mobile device connecting to the wireless network;
    an access technology component for determining an access technology to use to connect the mobile device to the wireless network prior to an interaction of the mobile device with the access technology, wherein the access technology component listens to cues based on a signaling from the mobile device, wherein the access technology is selected from among a plurality of access technologies that include a client mobile internet protocol technology, a simple internet protocol technology, and a proxy mobile internet protocol technology, and wherein the access technology is selected by evaluating cues, wherein the cues include
        (A) whether the mobile device responded to the device authentication stage, (B) whether the mobile device was authenticated,
(C) whether the device accepted or performed user authentication,
(D) whether the device provided a MIP registration request, and
(E) whether proxy MIP keys were negotiated between the mobile device and the network component;

a client mobile internet protocol component for connecting the mobile device to the wireless network using the client mobile internet protocol technology when the user is not authenticated, then determining to use client mobile Internet protocol;

a simple internet protocol component for connecting the mobile device to the wireless network using the simple internet protocol technology when the user is authenticated and no proxy MIP keys were negotiated;

a proxy mobile internet protocol component for connecting the mobile device to the wireless network using the proxy mobile internet protocol technology when the user is authenticated and proxy MIP keys were negotiated, wherein the authentication component, the access technology component, the client mobile internet protocol component, the simple internet protocol component, and the proxy mobile internet protocol component reside in an Access Service Network gateway.

11. The system according to claim 10, wherein the wireless network is a Worldwide Interoperability for Microwave Access network.

12. The system according to claim 10, wherein the client mobile internet protocol technology is used to connect the mobile device to the wireless network when a user is not authenticated during the authentication phase and a mobile internet protocol registration request is received from the mobile device.

13. The system according to claim 10, wherein the simple internet protocol technology is used to connect the mobile device to the wireless network when a user and the mobile device are authenticated during the authentication phase.

14. The system according to claim 10, wherein the proxy mobile internet protocol is used to connect the mobile device to the wireless network when a user and the mobile device are authenticated during the authentication phase, and at least one proxy mobile internet protocol key is negotiated during the authentication phase.

* * * * *